(12) United States Patent
Gilton

(10) Patent No.: US 7,303,471 B2
(45) Date of Patent: Dec. 4, 2007

(54) METHOD AND SYSTEM FOR TRANSFERRING DATA TO AN ELECTRONIC TOY OR OTHER ELECTRONIC DEVICE

(75) Inventor: Terry L. Gilton, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 706 days.

(21) Appl. No.: 10/229,866

(22) Filed: Aug. 27, 2002

(65) Prior Publication Data

US 2004/0043816 A1    Mar. 4, 2004

(51) Int. Cl.
*A63F 13/00* (2006.01)
(52) U.S. Cl. .......................... 463/39; 463/36
(58) Field of Classification Search ................ 463/39; 382/181; 358/142; 340/706; 345/156
See application file for complete search history.

(56) References Cited

U.S. PATENT DOCUMENTS

| | | | | |
|---|---|---|---|---|
| 4,044,227 | A | | 8/1977 | Holm et al. ............ 235/61.7 R |
| 4,807,031 | A | * | 2/1989 | Broughton et al. ......... 348/460 |
| 4,999,617 | A | * | 3/1991 | Uemura et al. ............. 345/156 |
| 5,647,787 | A | * | 7/1997 | Raviv et al. ................ 446/175 |
| 5,752,880 | A | * | 5/1998 | Gabai et al. ................... 463/1 |
| 6,092,078 | A | * | 7/2000 | Adolfsson ................... 707/102 |
| 6,094,228 | A | | 7/2000 | Ciardullo et al. .......... 348/473 |
| 6,229,572 | B1 | | 5/2001 | Ciardullo et al. .......... 348/473 |
| 6,366,707 | B1 | | 4/2002 | Gardner, Jr. et al. ....... 382/287 |
| 6,661,905 | B1 | | 12/2003 | Chupp et al. ............... 382/100 |
| 2002/0112250 | A1 | | 8/2002 | Koplar et al. .............. 725/153 |

OTHER PUBLICATIONS

ICv2 News, "Mattel's Batman Interactive Toys", www.icv2.com/articles/news/4235.html, Feb. 2004. Two pages.
Raving Toy Maniac™, "The Batman Interactive Toys", http://www.toymanai.com/news/messages/4637.shtml, Feb. 2004. pp. 1-5.
Veil Interactive Technologies, "Warner Bros. Consumer Products, Mattel and Veil Technology Announce First-Ever Truly Interactive Television Toy Line", http://www.veilinteractive.com/2003/VEILBatwave.htm, Feb. 2004. Three pages.

* cited by examiner

*Primary Examiner*—John M. Hotaling, II
*Assistant Examiner*—Jeffrey Wong
(74) *Attorney, Agent, or Firm*—Dorsey & Whitney LLP

(57) ABSTRACT

A method for transferring data from a display device to an electronic device includes displaying a visual pattern on the display device. The visual pattern represents the data being transferred. In the electronic device, the visual pattern is received and processed to obtain the data represented by the visual pattern. The visual pattern may be formed by an array of data elements, each data element representing at least one bit of data being transferred to the electronic device. A series of such arrays may be sequentially displayed on the display device. The visual pattern may alternatively be formed by a bar code that represents bits of data being transferred to the electronic device. A series of bar codes may be sequentially displayed on the display device.

31 Claims, 4 Drawing Sheets

METHOD AND SYSTEM FOR TRANSFERRING DATA TO AN ELECTRONIC TOY OR OTHER ELECTRONIC DEVICE

TECHNICAL FIELD

The present invention relates generally to data communication systems, and more specifically to transferring data to electronic devices.

BACKGROUND OF THE INVENTION

Modern electronic circuits are becoming increasingly smaller as the size of components forming such circuits steadily decreases. The cost of such electronic circuits is also steadily decreasing as new manufacturing techniques improve the yields and reliability of such circuits. As a result, increasingly sophisticated electronic circuits are being placed inside a variety of electronic devices, such as cell phones, digital cameras, smart appliances, and electronic toys. Current electronic toys include electronic circuitry which causes the toy to exhibit a variety of different behaviors, such as talking, walking, flashing lights, displaying information to a user, or exhibiting emotions like being happy or sad.

In a typical electronic toy, the electronic circuitry includes a memory that stores data that defines various pre-programmed behaviors. The electronic circuitry utilizes the stored data, which may include programming instructions to be executed by the electronic circuitry, to cause the toy to exhibit different behaviors. The data stored in the memory typically cannot be altered, which precludes the addition of desired behaviors after the toy has been assembled, and requires more memory as more behaviors are included. To allow the behaviors exhibited by a toy to be changed, however, the electronic circuitry in some toys includes a communications port, such as a Universal Serial Bus (USB) port, which allows new data to be transferred into the toy's memory to thereby provide the toy with new behaviors. In this situation, the communications port of the toy is coupled to a communications port of a computer which, in turn, transfers the desired data into the toy's memory. Because of the small size and relatively low cost, such a communications port can be used with small toys.

The inclusion of a communications port in the toy requires the use of a computer by the toy user, and thus requires at least a moderate level of technical savvy to properly perform the interconnection of the communications ports and initiate communication between the toy and the computer. Moreover, if the toy user must obtain the data to be transferred to the toy over the Internet, the user must have Internet access as well as the requisite technical knowledge to navigate the Internet and find the data sought, and thereafter transfer the data through the computer to the toy. Many times the toy user will be a child, meaning the technical ability to operate the computer and access the Internet may be lacking and thus require help from a parent or other adult. Moreover, the use of a communications port on the toy assumes the user has computer access, which may not always be true. Other alternatives for inputting data into a toy are possible, such as a keypad on the toy or a mass storage device like a floppy disk or CD-ROM drive in the toy. Such alternatives are not practical in most situations for a variety of reasons, however, including increased cost and size limitations of the toy.

Accordingly, there is a need for a simple method of transferring user-selected data to an electronic toy, smart appliance, or other electronic device without the need for using a computer.

SUMMARY OF THE INVENTION

According to one aspect of the present invention, a method for transferring data from a display device to an electronic device includes displaying a visual pattern on the display device. The visual pattern represents the data being transferred. In the electronic device, the visual pattern is received and processed to obtain the data represented by the visual pattern. The visual pattern may be formed by an array of data elements, each data element representing at least one bit of data being transferred to the electronic device. A series of such arrays may be sequentially displayed on the display device. The visual pattern may alternatively be formed by a bar code that represents bits of data being transferred to the electronic device. A series of bar codes may be sequentially displayed on the display device.

DETAILED DESCRIPTION OF THE INVENTION

Figure 1:
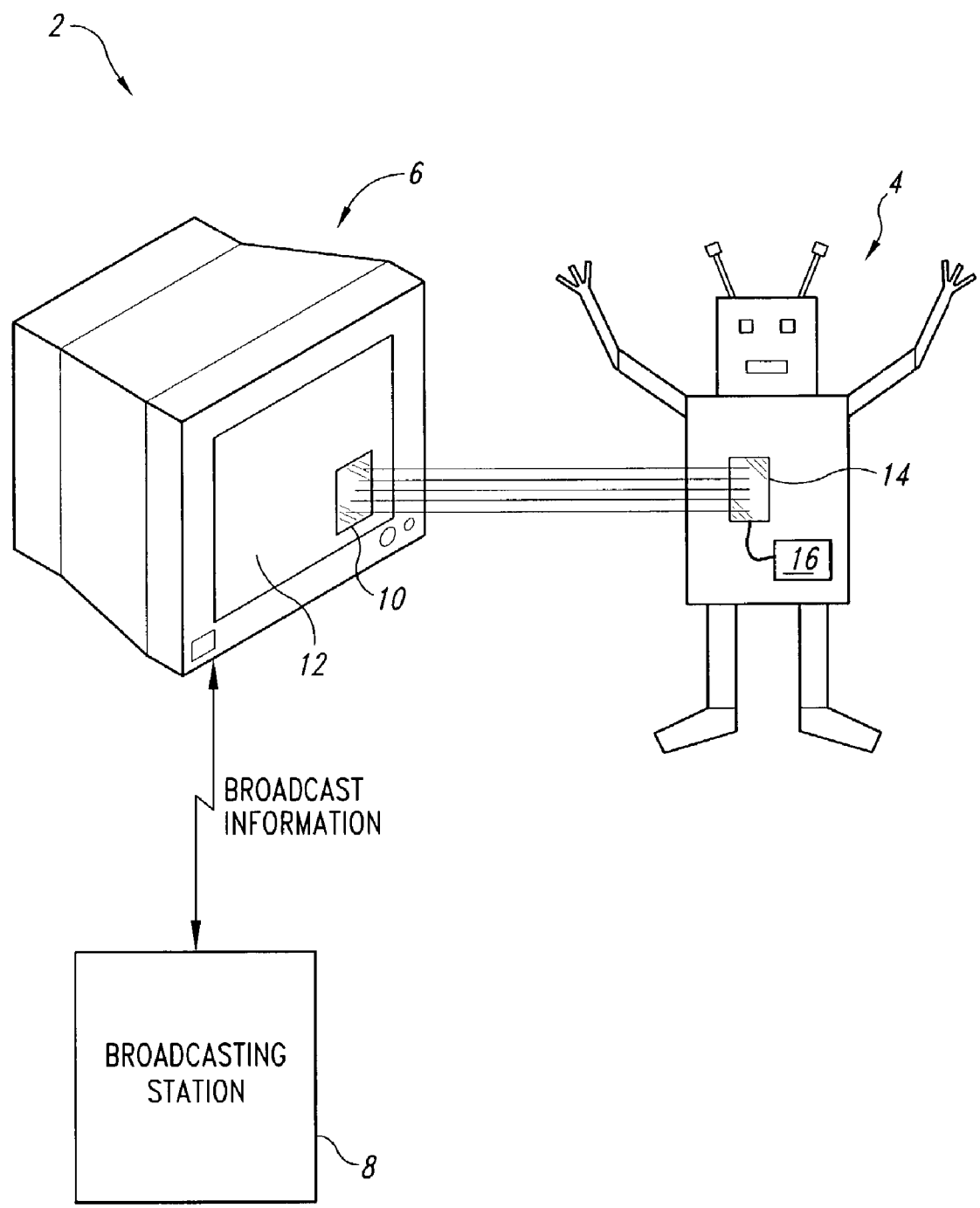
FIG. 1 is a functional block diagram of a data transfer system for transferring data to an electronic toy using a television screen according to one embodiment of the invention.

FIG. 1 is a functional block diagram of a data transfer system 2 for transferring data to an electronic toy 4 using a conventional television 6 according to one embodiment of the present invention. The data transfer system 2 provides a simple and convenient way for anyone, including children, to transfer data into the electronic toy 4 by simply holding the toy in front of a transfer area 10 displayed on a screen 12 of the television 6, as will be explained in more detail below. In the following description, certain details of the present invention are set forth in association with the description of several embodiments of the present invention. One skilled in the art will understand, however, that the present invention may be practiced without these particular details.

The television 6 receives broadcast information from a broadcasting station 8, which provides or broadcasts the information to the television via any of a variety of known mediums, such as through the air or through an electronic cable. The television 6 displays the received broadcast information on the screen 12. This broadcast information includes conventional picture data to be displayed on the screen 12, and also includes toy data to be displayed in the transfer area 10 on the screen. The screen 12 displays the conventional picture data and toy data in the transfer area 10 in the form of light emitted from the screen, as will be understood by those skilled in the art. Unlike the conventional picture data, which is to be viewed by a person watching the television 6, the data displayed in the transfer area 10 is not intended to viewed. Instead, the data displayed in the transfer area 10 corresponds to the data to be transferred to the electronic toy 4, as will be discussed in more detail below. The screen 12 may be a conventional cathode ray tube (CRT), a liquid crystal display (LCD), a plasma display, or any other type of display technology.

The electronic toy 4 includes a photoelectric detector 14 that generates electrical signals in response to light applied to the detector, and provides the electrical signals to electronic circuitry 16 coupled to the detectors. When the photoelectric detectors 14 are positioned adjacent the transfer area 10, the photoelectric detectors receive light signals corresponding to the data displayed in the transfer area 10, and convert the received light signals into corresponding electrical signals. The photoelectric detector 14 may, for example, be formed from an array of photo diodes or other suitable circuitry capable of receiving light emitted from the transfer area 10 and converting the received light into corresponding electrical signals. The electronic circuitry 16 in the toy 4 processes the electrical signals from the photoelectric detector 14 to thereby store the data displayed in the transfer area 10 in the toy. The electronic circuitry 16 also includes components for controlling the toy 4 to perform desired functions, such as talking and displaying emotions, using the stored data received via the transfer area 10 and other data stored in the circuitry. Suitable electronic circuitry 16 for processing the electrical signals from the photoelectric detector 14 and controlling the toy 4 will be understood by those skilled in the art, and thus, for the sake of brevity, will not be described in more detail.

In operation of the data transfer system 2, the broadcasting station 8 transmits the broadcast information to the general public in the form of a television program including the conventional picture data to be displayed and the toy data to be displayed in the transfer area 10 on the screen 12. A user of the television 6 tunes the television to receive the program as desired, and during all or a portion of the program the broadcast information includes the toy data to be displayed in the transfer area 10 and transferred to the electronic toy 4 in the user's possession. Where the toy data is provided only during a portion of the television program, the beginning of the transmission of the toy data can be signaled, for example, by an announcer in the program or by a characteristic sound or display contained in the broadcast data and thereby displayed on the television 6. The signal of the toy data transmission may also indicate where the transfer area 10 will be located on the screen 12 as well as the orientation of the electronic toy 4 required to properly read the toy data being displayed in the transfer area 10.

Once the user has been signaled that the transmission of the toy data is forthcoming, the user places the electronic toy 4 up to the screen 12 adjacent the transfer area 10, with the toy being oriented to properly position the photoelectric detectors 14. The photoelectric detectors 14 thereafter receive the toy data in the form of the light emitted from the transfer area 10, and convert the received light into corresponding electrical signals which are then stored by the electronic circuitry 16. In this way, the visual pattern representing the toy data that is displayed on the television screen 12 is used to transfer the toy data to the electronic toy 4. Once the toy data is stored in the electronic circuitry 16 in the toy 4, the electronic circuitry utilizes the toy data to modify the control of the toy. For example, the toy data may correspond to a new program which the electronic circuitry 16 executes to cause the toy to display a new emotion or speak a new phrase.

In one embodiment, the electronic circuitry 16 includes a switch allowing the user to activate and deactivate the photoelectric detectors in the receiver 14. The user could then use the switch to activate the photoelectric detectors 14 responsive to the signal of the start of toy data transmission from the television 6, and upon conclusion of the transmission the television could once again signal the user, who would then use the switch to deactivate the photoelectric detectors. When the photoelectric detectors 14 are deactivated, the electronic circuitry 16 uses the new toy data just transferred into the toy to reprogram or modify the behavior of the toy, or to trigger the toy to begin exhibiting a new behavior corresponding to data already stored in the electronic circuitry 16. Alternatively, the toy data could be transmitted continuously throughout the television program, allowing the user to position the toy 4 adjacent the transfer area 10 at any time during the program to transfer the data into the toy. In this embodiment, the toy data would include appropriate synchronization information to allow the electronic circuitry 16 in the toy 4 to determine the start and end of the toy data transmission, as will be understood by those skilled in the art.

In addition to the broadcasting station 8, the data transfer system 2 may also include a video cassette recorder (VCR) or digital video disk (DVD) player to provide the broadcast information to the television 6. When a VCR or DVD player is used, the operation of the data transfer system 2 is similar to the operation just described for the broadcast information from the broadcasting station 8, except that a prerecorded program is supplied to the television 6 from the VCR or DVD player. Thus, at some point during the prerecorded program the user is prompted to position the electronic toy 4 adjacent the transfer area 10 to thereby transfer data into the toy. In addition, with a DVD player, instead of simply playing a program including the toy data, a menu driven option could allow a user to select the desired toy data from a list of available toy data stored on a disk in the DVD player, and thereby choose the toy data to transfer to the toy 4.

The toy data transferred to the electronic toy 4 includes data that may be used by existing programs running on the electronic circuitry 16 in the toy as well as new programs to be executed. For example, a the toy data may correspond to a new program that alters the behavior of the toy 4. New toy data can be transferred to the electronic toy 4 as often as desired, and given the simplicity of the entire procedure, along with easily understood prompts, even small children are capable of fulfilling the requirements of properly positioning the electronic toy 4 at the proper time to transfer the desired toy data. Thus, in contrast to conventional methods of transferring data to an electronic device like the toy 4, such as connecting a device to a computer via a USB or other communications port, the data transfer system 2 requires no computer or knowledge of how to operate the computer, and no knowledge of how to interconnect the electronic device and computer. All a user needs is the toy 4, an ability to listen to signals provided via the television 6, and an ability to properly position the toy adjacent the transfer area 10 responsive to the signals.

Figure 2:
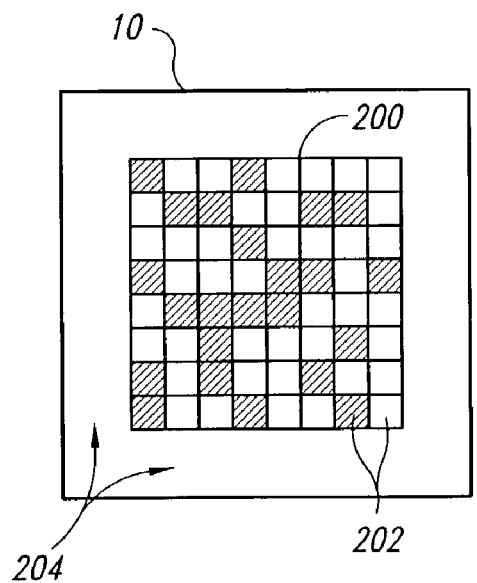
FIG. 2 is a diagram illustrating an array of binary data displayed in a transfer area on the television screen of FIG. 1 according to one embodiment of the invention.

The overall operation of the data transfer system 2 has been described with reference to FIG. 1, and now several components of the system will be described in more detail. As previously mentioned, the toy data being transferred to the electronic toy 4 is displayed in the transfer area 10. The toy data can be displayed within the transfer area 10 in a variety of different ways. FIG. 2 is a diagram illustrating one embodiment of the transfer area 10 in which the toy data is displayed as an array 200 of data elements 202. Each data element 202 corresponds to a single bit of data to be transferred to the electronic toy 4, and is formed by one or picture elements or "pixels" on the television screen 12. In FIG. 2, each data element 202 represents a first binary value (e.g., "1") when black and the complementary binary value (e.g., "0") when white. In this way, each data element 202 transfers a single bit of data to the electronic toy 4 (not shown in FIG. 2) in the form of either a first or second color of light transmitted to the photoelectric sensors 14 (FIG. 1) on the toy. With the array 200, a plurality of toy data bits are transferred in parallel to the electronic toy 4. For example, where the array 200 includes N rows and M columns of data elements 202, each array contains N×M toy data bits that are simultaneously transferred to the electronic toy 4. A sequence of arrays 200 is displayed in the transfer area 10 to sequentially transfer toy data bits to the electronic toy 4 N×M bits at a time, unless the total number of bits being transferred can be transferred through a single array 200.

The transfer area 10 may further include a plurality of border elements 204 defined between the outermost data elements 202 in the array 200 and the outer edges of the transfer area. The border elements 204 are formed by a plurality of pixels on the screen 12. All the border elements 204 have the same color, which is white in the embodiment of FIG. 2, and do not change during transmission of the toy data via the data elements 202. The border elements 204 allow the electronic toy 4 to be dynamically positioned in the proper location adjacent the transfer area 10 during operation of the system 2, as will be described in more detail below.

Figure 3:
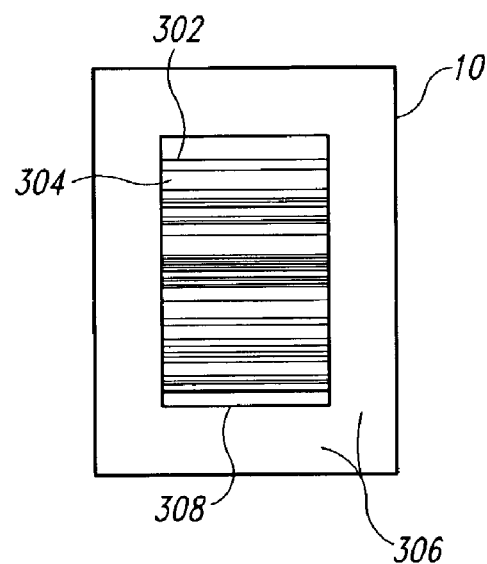
FIG. 3 is a diagram illustrating a bar code displayed in the transfer area on the television screen of FIG. 1 according to another embodiment of the invention.

FIG. 3 is a diagram illustrating another embodiment of the transfer area 10 in which the toy data is displayed as a bar code 300. The bar code 300 is formed in the transfer area 10 by selectively illuminating pixels on the television screen 12. In the embodiment of FIG. 3, the individual pixels are illuminated either black or white to thereby form bars 302 and spaces 304 that collectively form the bar code 300. The bars 302 and spaces 304 forming the bar code 300 represent data, and the photoelectric sensors 14 (FIG. 1) on the toy 4 detect the bar code displayed in the transfer area 10 and thereby detect the data represented by the bar code. The bar code 300 may represent a plurality of binary toy data bits, and thus each bar code provides a plurality of toy data bits that are transferred in parallel to the electronic toy 4. As with the array 200 of FIG. 2, a sequence of bar codes 300 is displayed in the transfer area 10 to sequentially transfer toy data bits to the electronic toy 4, unless the total number of bits being transferred can be transferred through a single bar code. The bar code 300 may be any of various suitable bar code types known in the art, as long as the bar code can be reliably sensed by the photoelectric detectors 14 in the toy 4

In both the transfer areas 10 shown in FIGS. 2 and 3, a plurality of toy data bits are represented and simultaneously transferred to the toy 4, as previously discussed. It is also possible, however, to utilize a single data element in the transfer area 10, with the single data element being formed by plurality of pixels on the television screen 12. This embodiment may be thought of as the array 200 of FIG. 2 in which the array is formed by a single data element 202. In this embodiment, the single data element is illuminated either a first color representing a first binary logic state or a second color representing the complementary logic state. The single data element is illuminated the first or second color for a pre-selected period of time to thereby represent a single toy data bit. In this way, the single data element is sequentially illuminated to communicate a string of toy data bits in the form of light of the first or second color emitted from the transfer area 10. Once again, the photoelectric detectors 14, which is this case could be a single photo diode, receives the light corresponding to the toy data bits and converts the received light into an electrical signal corresponding to the toy data bits being transferred.

Figure 4:
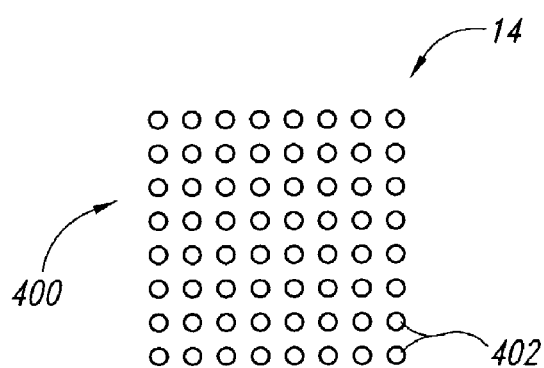
FIG. 4 is a functional schematic diagram illustrating one embodiment of a sensor contained in the electronic toy of FIG. 1.

FIG. 4 is a functional schematic diagram of one embodiment of the photoelectric detectors 14 of FIG. 1, which are formed by a sensor array 400 including a plurality of individual sensors 402. The sensor array 400 can be used in sensing toy data bits when the transfer area 10 is formed by the array 200 of data elements 202 of FIG. 2 or the bar code 300 of FIG. 3, although the manner in which the electronic circuitry 16 (FIG. 1) coupled to the sensor array processes the signals from the individual sensors 402 will differ depending on the embodiment of the transfer area being used, as will be appreciated by those skilled in the art. Briefly, when the data transfer system 2 includes the transfer area 10 of FIG. 2, each sensor 402 senses the light emitted from a corresponding data element 202 in the array 200 when the toy 4 is properly positioned adjacent the transfer area 10, and generates a corresponding electric signal responsive to the sensed light. In this way, each sensor 302 senses a respective toy data bit being transferred to the toy 4. Conversely, when the transfer area 10 displays the bar code 300 of FIG. 3, the signals from respective sensors 402 collectively indicate the displayed bar code, and the electronic circuitry 16 processes these signals to detect the displayed bar code and the toy data bit represented by the bar code. The sensor array 400 of sensors 402 can be formed from photo diodes, a charge-coupled device, or other suitable circuitry, as will be appreciated by those skilled in the art.

The above embodiments of the transfer area 10 and photoelectric detectors 14 assume binary colors, such as black and white, are used to represent individual toy data bits. Alternatively, multiple colors could be utilized to transfer more toy data bits at a time to the toy 4 and thereby increase the data transfer rate or bandwidth of the data transfer system 2. For example, in the embodiment of FIG. 2, if each data element 202 may be one of 8 colors, then each data element may represent three binary toy data bits. When the data element 202 has a first color, the corresponding toy data bits equal (000), when the data element has a second color the data bits equal (001), a third color and the data bits equal (010), and so on, as will be appreciated by those skilled in the art. In this way, each single N×M array 200 could represent 3×N×M toy data bits and thus the bandwidth of the toy data bits would be tripled relative to the binary color embodiment. When multiple colors are used to represent each data element 202, the photoelectric detectors 14 must, of course, be capable of sensing the respective colors for each data bit.

Figure 5:
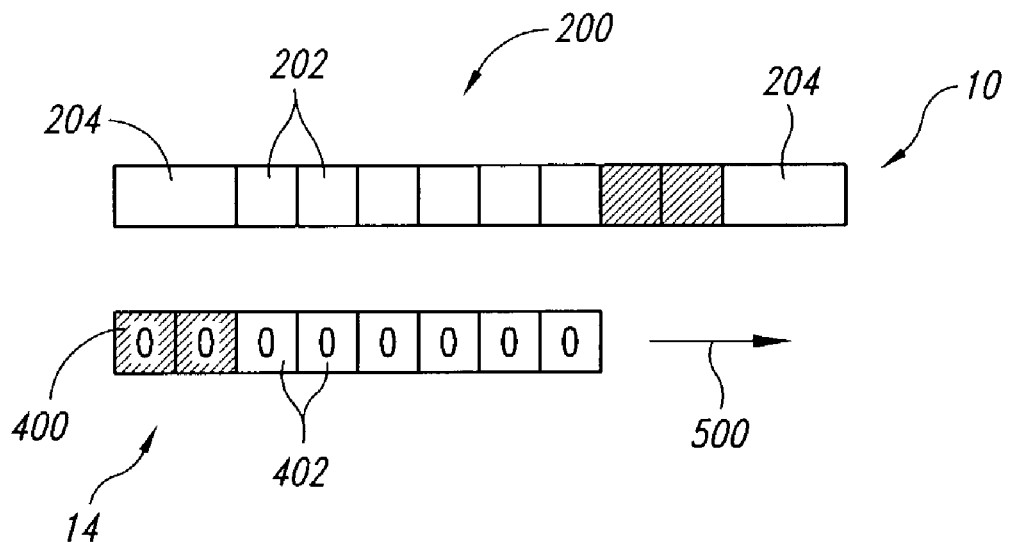
FIG. 5 is a top-view of the transfer area of FIG. 2 and the photoelectric detectors of FIG. 4 illustrating an example of the relative position between the two during operation of the data transfer system of FIG. 1.

As previously mentioned, the transfer area 10 may include a plurality of border elements 204 defined between the outermost data elements 202 in the array 200 and the outer edges of the transfer area to allow the electronic toy 4 to be dynamically positioned in the proper location adjacent the transfer area, as will now be explained in more detail with reference to FIG. 5. FIG. 5 is a top-view of the transfer area 10 of FIG. 2 and the photoelectric detectors 14 of FIG. 4 illustrating an example of the relative position between the two during operation of the data transfer system 2. With the relative position between the sensor array 400 and transfer area 10 illustrated in FIG. 5, the two far left columns of sensors 402 in the sensor array 400, which are marked with diagonal lines in FIG. 5, will not sense toy data bits because these columns of sensors are positioned adjacent the border elements 204 of the transfer area. Recall, the border elements 204 have the same color throughout transmission of the toy data via the data elements 202 in the array 200, and do not represent toy data bits. Thus, in FIG. 5 the photoelectric detectors 14 and thereby the toy 4 are not positioned properly, but are positioned to far to the left of the transfer area 10. As a result, the two far left columns of sensors 402 in the array 400 do not properly detect data elements 202 in the transfer area 10. Moreover, the two far right columns of data elements 202 in the array 200, which are identified with diagonal lines in FIG. 5, are not detected by any sensors 402 in the sensor array 400 due the improper positioning of the sensor array relative to the transfer area 10.

The static nature of the border elements 204 allow the electronic circuitry 16 (FIG. 1) coupled to sensors 402 to detect the improper positioning of the sensors relative to the transfer area 10. Any sensors 402 receiving light from the border elements 204 will provide corresponding electrical signals that do not vary over time, but instead remain the same or are static. In contrast, the electrical signals from the sensors 402 receiving light from the data elements 202 will vary as a function of time as the colors of the data elements will vary to represent either binary 1s or 0s. Thus, by monitoring the electrical signals from the sensors 402, the electronic circuitry 16 can detect the improper positioning of the sensors 402 relative to the transfer area 10 when static electrical signals are detected. In the example of FIG. 5, the electrical circuitry 16 detects static electrical signals from the sensors 402 in the two far left columns of the array 400, thus indicating the array needs to be moved to the right, as indicated by the arrow 500 in FIG. 5. The electrical circuitry 16 would then provide some sort of feedback to the user of the toy 4, instructing the user to move the toy to the right. The electrical circuitry 16 can detect any improper positioning of the toy 4 in this manner, such as the toy 4 being out of position to the left, or too high or low relative to the transfer area 10, as will be appreciated by those skilled in the art.

Figure 6:
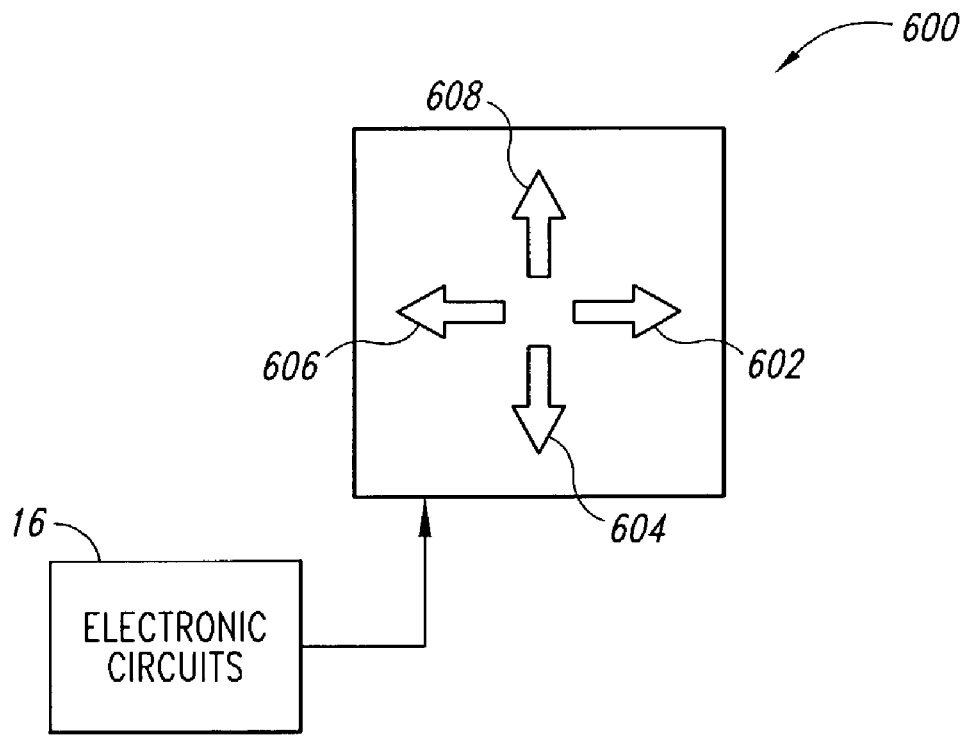
FIG. 6 is a functional diagram of one embodiment of an alignment indicator contained in the electronic toy of FIG. 1.

FIG. 6 is a functional diagram of an alignment indicator 600 included on the toy 4 and coupled to the electronic circuitry 16 to assist the user in properly positioning the toy as previously described. The alignment indicator 600 includes a right arrow light 602 which the electrical circuitry 16 illuminates to prompt the user to move the toy 4 to the right. Alternately, if the toy 4 is too high relative to the transfer area 10, the electrical circuitry 16 illuminates a down arrow light 604 to prompt the user to move the toy 4 down relative to the transfer area 10. The electrical circuitry 16 similarly illuminates a left arrow light 606 and up arrow light 608 to prompt the user to move the toy 4 to the left and up, respectively. FIG. 5 shows only one possible embodiment of the alignment indicator 600, but it should be understood that other indicators for prompting the user to move the toy 4 in a desired direction may also be used. For example, in another embodiment of the alignment indicator, appendages on the toy 4 can be actuated to prompt the user to move the toy in a desired direction. For example, the toy 4 may move its arms, legs, head or eyes to point to the right if the toy 4 should be moved to the right. Such behavior can be adjusted to indicate any desired direction. Alternatively the alignment indicator could be formed by an audio indicator in the toy 4, causing the toy to issue verbal prompts to tell the user in what direction to move the toy. For example, if the toy 4 is too far to the left, it can say "move me to the right" and continue this phrase or others, such as "a little more" until the toy is correctly positioned.

Figure 7:
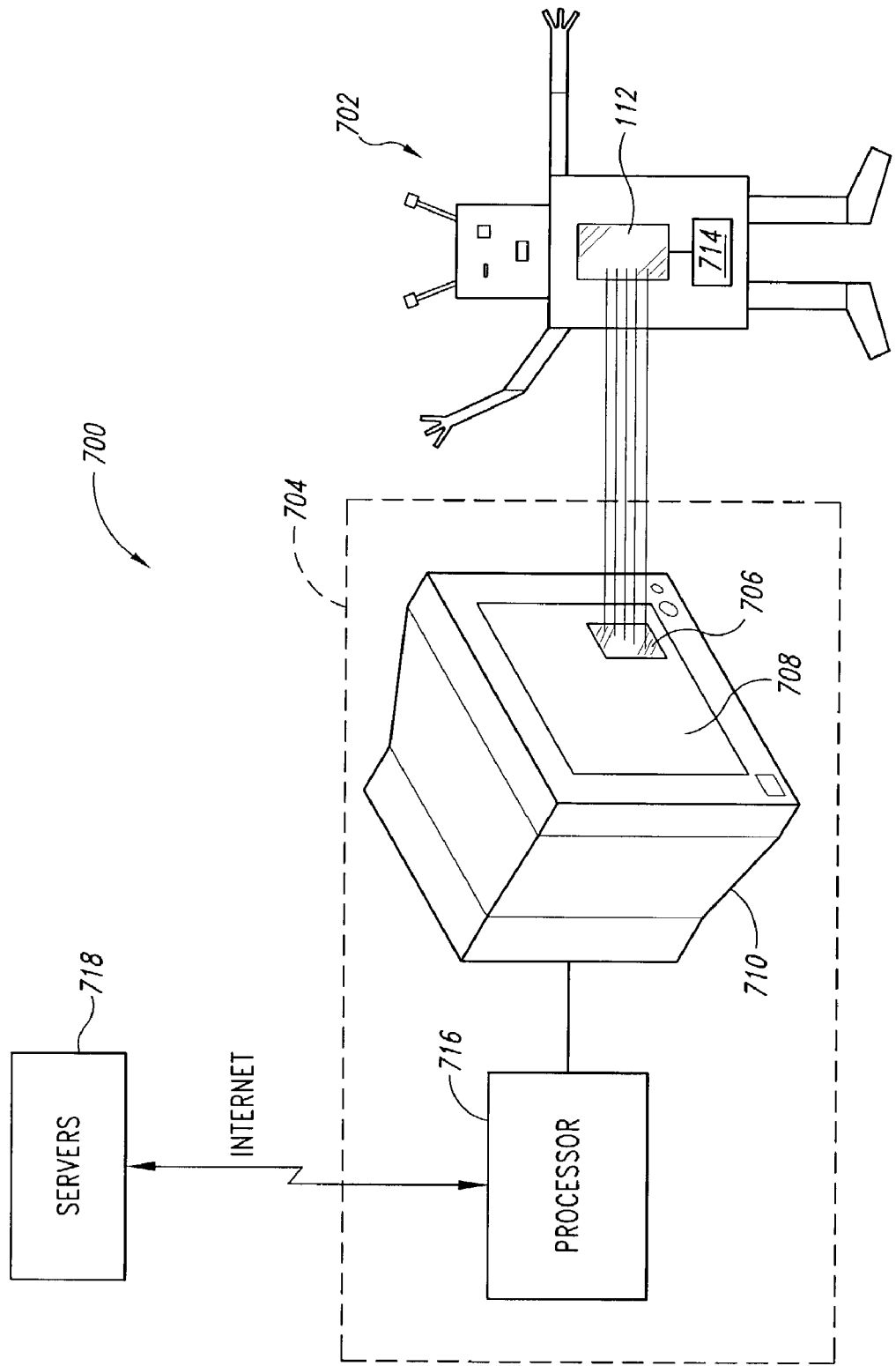
FIG. 7 is functional block diagram of a data transfer system for transferring data to an electronic toy via a Web page displayed on a computer system according to another embodiment of the invention.

FIG. 7 is a functional block diagram illustrating a data transfer system 700 for transferring data to an electronic toy 702 according to another embodiment of the present invention. The data transfer system 700 includes a computer system 704 instead of the television 6 of the data transfer system 2 of FIG. 1, with the computer system allowing a user to access desired data and thereafter transfer the data to the electronic toy 702 by simply holding the toy in front of a transfer area 706 displayed on a screen 708 of a computer monitor 710, as will now be explained in more detail. The data transfer system 700 operates in much the same way as the data transfer system 2 to transfer data to the toy 702, but also allows a user to more easily select the desired data to be transferred. The electronic toy 702 includes photoelectric detectors 712 and electronic circuitry 714 that operate in the same way as the detectors 14 and electronic circuitry 16, respectively, of FIG. 1, and thus, for the sake of brevity, these components will not be described in more detail.

The computer system 704 further includes a processor 716 coupled to the monitor 710 and linked through the Internet or other suitable communications network to external servers 718 that include toy data to be transferred to the toy 4. The servers 718 must execute appropriate software to support the transfer of toy data files, as will be appreciated by those skilled in the art. For example, the server must render Web pages that include menus and appropriate links to allow a user to select desired data, and also must provide the selected data in the in the appropriate form, such as the array 200 of FIG. 2 or bar code 300 of FIG. 3, in the transfer area 706, or must provide appropriate files to enable the computer system 704 to provide the data in the transfer area, as will be appreciated by those skilled in the art. Similarly, the processor 716 in the computer system 704 must execute suitable software, such as a Web browser, to allow a user to access the desired Web sites over the Internet in a conventional manner. Briefly, when the user of computer system 704 accesses a particular Web site, the corresponding server 718 provides corresponding files to the computer system which, in turn, displays the files on the screen 708. The user may then select links in the files in a known manner to access desired content on the Web site. The computer system 704 may be conventional personal computer, a personal digital assistant (PDA), or any other computer system having any type of screen for conveying visual information to a user.

As previously mentioned, the operation of the data transfer system 704 is similar to that of the data transfer system 2 of FIG. 1, except the data transfer system 4 allows a user to select desired data stored on remote servers 718 by visiting the corresponding Web site. In operation, the user accesses the desired Web site via the computer system 704 and thereafter navigates through Web pages on the site to choose the desired data to be transferred to the toy 702. Once a desired selection is made, the computer system 704 steps the user through the process of transferring the selected toy data into the electronic toy 702. For example, the computer system 704 can prompt the user, through messages on the screen 708 or verbal commands issued through speakers in the computer system, to place the toy 702 in the proper position adjacent the screen 708 so that the photoelectric detectors 712 are properly aligned with the transfer area 706 on the screen. The computer system 704 may also signal or alert the user as to when the data transfer will take place may allow the user to control the exact moment at which transmission of data to the toy 702 begins. Thus, the data transfer system 700 provides the user with an easy way to select desired data and an equally easy way to actually transfer the selected data into the toy 702. As a result, a relatively unsophisticated user, such as a young child, whom is familiar with the Internet can use the computer system 704 to access and transfer desired data without requiring any more sophisticated technical knowledge, such as how to download a file from a Web site and thereafter transfer that file to the toy 702 or other electronic device via a USB port of the computer system 704.

Instead of accessing data via the Internet, the computer system 704 may also be used to access data stored on a CD-ROM, DVD, or floppy disk and to transfer the accessed data to the toy 702, as will be understood by those skilled in the art. In addition, the monitor 710 can be set to different resolutions, which will, of course, affect how the data is displayed in the transfer area 706. Because the monitor 710 must be set to the proper resolution to allow the data displayed in the transfer area 706 to be properly sensed by the photoelectric detectors 712, the user could be prompted to verify the screen resolution is properly set as part of the transfer process.

Although the data transfer systems 2, 700 have been described as transferring data to the electronic toys 4, 702, one skilled in the art will appreciate that these systems can be utilized to transfer data to any electronic device. All that is required is that the electronic device include a suitable photoelectric detector and electronic circuitry as described for the toys 4, 702. For example, the electronic device could be a smart appliance. In this situation, a user could access a Web site maintained by the manufacturer of the smart appliance and access, for example, new firmware to upgrade performance of or correct a defect in the smart appliance. The data may then be easily transferred to the electronic device using the systems 2, 700. The data transfer rate of the systems 2, 700 determines the amount of time it takes to transfer the data to the electronic device. Thus, the data transfer rate presents a limit on the amount of data (i.e., the size of files) that can be transferred to the electronic device within a reasonable time, as will be appreciated by those skilled in the art.

The description of the illustrated embodiments of the invention is not intended to be exhaustive or to limit the invention to the precise form disclosed. While specific embodiments of, and examples of, the invention are described in the foregoing for illustrative purposes, various equivalent modifications are possible within the scope of the invention, as those skilled in the relevant art will recognize. Moreover, the various embodiments described above may be combined to provide further embodiments. Accordingly, the invention is not limited by the disclosure, but instead the scope of the invention is to be determined entirely by the following claims.

The invention claimed is:

1. A method for transferring data from a display device to an electronic device, the method comprising:
    displaying a visual pattern on the display device, the visual pattern representing the data being transferred; and
    in the electronic device,
        receiving the visual pattern,
        determining from the visual pattern whether the electronic device is properly positioned relative to the visual pattern;
        if the electronic device is determined not to be properly positioned relative to the visual pattern, determining a direction corresponding to the position of the electronic device relative to the visual pattern and displaying the direction; and
        processing the received pattern to obtain the data represented by the visual pattern when the electronic device is properly positioned to the visual pattern.

2. The method of claim 1 wherein the visual pattern comprises an array of data elements, each data element representing a bit of data being transferred to the electronic device.

3. The method of claim 2 wherein the visual pattern comprises a series of arrays of data elements sequentially displayed on the display device.

4. The method of claim 1 wherein the visual pattern comprises a bar code, the bar code representing bits of data being transferred to the electronic device.

5. The method of claim 4 wherein the visual pattern comprises a series of bar codes sequentially displayed on the display device.

6. The method of claim 1 wherein data composes program instructions to be executed by the electronic device.

7. The method of claim 1 wherein the electronic device comprises an electronic toy.

8. The method of claim 7 wherein the data includes data that causes the electronic toy to modify a behavior exhibited by the electronic toy.

9. The method of claim 1 wherein the display device comprises a television screen or a computer monitor.

10. The method of claim 1 wherein displaying a visual pattern further comprises providing a user prompt just prior to displaying the visual pattern.

11. The method of claim 10 wherein the user prompt comprises displaying a visual prompt.

12. The method of claim 1 wherein the visual pattern comprises a sequence of patterns, and wherein the visual pattern includes a preamble that enables the operation of processing the received pattern to determine the start of the sequence.

13. An electronic toy, comprising:
    an array of photoelectric detectors adapted to receive from a display a visual pattern that represents data, the photoelectric detectors being operable to generate electrical signals responsive to the visual pattern;
    a memory operable to store data; and
    a processor coupled to the array of photoelectric detectors and the memory, the processor operable to generate the data represented by the visual pattern responsive to the electrical signals and store the generated data in the memory, the processor further operable to read the data from the memory to alter an aspect of operation of the electronic toy, the array of photoelectric detectors, the memory and the processor located together in the electronic toy;

wherein the processor is further operable to determine from the visual pattern whether the electronic device is properly positioned relative to the visual pattern, if the electronic device is determined not to be properly positioned relative to the visual pattern, determine a direction corresponding to the position of the electronic device relative to the visual pattern and display the direction.

14. The electronic device of claim 13 wherein the visual pattern comprises a time-dependent visual pattern that represents binary data.

15. The electronic device of claim 13 wherein the visual pattern comprises a plurality of bar codes that are sequentially received by the photoelectric detectors.

16. The electronic device of claim 13 wherein the array of photoelectric detectors comprise an array of photo diodes.

17. The electronic device of claim 13 wherein the data comprises programming instructions to be executed by the processor in the electronic device.

18. A data transfer system, comprising:
a display device including a display screen, the display device operable to display a time-dependent visual pattern on the display screen, the time-dependent visual pattern representing a plurality of bits of data; and
an electronic device including an array of photoelectric detectors operable to receive the visual pattern when the electronic device is positioned adjacent the display screen, and if the electronic device is determined not to be properly positioned relative to the visual pattern, determining a direction corresponding to the position of the electronic device relative to the visual pattern and displaying the direction, and further including a memory operable to store data, the array of photoelectric detectors being operable to generate a plurality of electrical signals responsive to the visual pattern and the electronic device being operable to concurrently generate the plurality of bits of data represented by the visual pattern responsive to the electrical signals and further operable to store the bits of data represented by the visual pattern in the memory.

19. The data transfer system of claim 18 wherein the display device comprises a television.

20. The data transfer system of claim 19 wherein the television receives a broadcast signal including the information corresponding to the visual pattern, and the television displays the visual pattern responsive to the received broadcast signal.

21. The data transfer system of claim 20 wherein the broadcast signal comprises a signal propagated through the earth's atmosphere.

22. The data transfer system of claim 18 wherein the electronic device comprises a computer system.

23. The data transfer system of claim 22 wherein the computer system receives a data signal including the information corresponding to the visual pattern, and the computer system displays the visual pattern responsive to the received data signal.

24. The data transfer system of claim 23 wherein the data signal comprises a Web page.

25. The data transfer system of claim 23 wherein the computer system receives the data signal responsive to a user request provided from the computer system.

26. The data transfer system of claim 18 wherein the electronic device is further operable to store the generated data for later use by the electronic device.

27. The data transfer system of claim 18 wherein the time-dependent visual pattern represents binary data.

28. The data transfer system of claim 18 wherein the time-dependent visual pattern comprises a plurality of bar codes that are sequentially received by the photoelectric detectors.

29. The data transfer system of claim 18 wherein the photoelectric detectors comprise an array of photo diodes.

30. The data transfer system of claim 18 wherein the electronic device comprises an electronic toy.

31. The data transfer system of claim 18 wherein the data comprises programming instructions to be executed by circuitry in the electronic device.

* * * * *

UNITED STATES PATENT AND TRADEMARK OFFICE
CERTIFICATE OF CORRECTION

| | | |
|---|---|---|
| PATENT NO. | : 7,303,471 B2 | Page 1 of 1 |
| APPLICATION NO. | : 10/229866 | |
| DATED | : December 4, 2007 | |
| INVENTOR(S) | : Gilton | |

It is certified that error appears in the above-identified patent and that said Letters Patent is hereby corrected as shown below:

On the Title page, item (56), under "Other Publications", in column 2, line 2, delete "4235" and insert -- 4253 --, therefor.

In column 10, line 34, in Claim 6, delete "composes" and insert -- comprises --, therefor.

Signed and Sealed this

Eighth Day of April, 2008

JON W. DUDAS
*Director of the United States Patent and Trademark Office*